(12) United States Patent
Ramones et al.

(10) Patent No.: US 9,967,439 B2
(45) Date of Patent: May 8, 2018

(54) CAMERA WITH HOUSING CONFIGURED TO RECEIVE MOUNTING STRUCTURE

(71) Applicant: Netgear, Inc., San Jose, CA (US)

(72) Inventors: John Kui Yin Ramones, San Ramon, CA (US); Jennifer Sarah Ouk, San Francisco, CA (US); Beau Oyler, Walnut Creek, CA (US); Yulian Bagirov, Oakland, CA (US); Jared Hull Aller, Oakland, CA (US); Charles Lyman Bates, III, Oakland, CA (US)

(73) Assignee: Netgear, Inc., San Jose, CA (US)

( * ) Notice: Subject to any disclaimer, the term of this patent is extended or adjusted under 35 U.S.C. 154(b) by 0 days. days.

(21) Appl. No.: 15/132,779

(22) Filed: Apr. 19, 2016

(65) Prior Publication Data

US 2017/0085757 A1 Mar. 23, 2017

Related U.S. Application Data

(63) Continuation-in-part of application No. 29/539,891, filed on Sep. 18, 2015, now Pat. No. Des. 785,067.

(51) Int. Cl.
*H04N 5/225* (2006.01)
*G03B 17/02* (2006.01)

(52) U.S. Cl.
CPC .......... *H04N 5/2252* (2013.01); *G03B 17/02* (2013.01); *H04N 5/2254* (2013.01)

(58) Field of Classification Search
CPC ..... F16M 11/041; F16M 11/14; F16M 13/022
See application file for complete search history.

(56) References Cited

U.S. PATENT DOCUMENTS

| | | | |
|---|---|---|---|
| 7,909,521 B2* | 3/2011 | Son | G03B 17/00 248/181.1 |
| 8,414,201 B2 | 4/2013 | Skeoch et al. | |
| 8,497,657 B2 | 7/2013 | Franks et al. | |
| 8,900,009 B2* | 12/2014 | Hornick | H01R 13/73 248/288.51 |
| 9,071,740 B1 | 6/2015 | Duffy et al. | |
| 9,301,412 B2* | 3/2016 | Micko | F16B 9/026 |
| 9,611,978 B2* | 4/2017 | Manniche | F16M 13/022 |
| 2005/0247845 A1 | 11/2005 | Li et al. | |
| 2009/0196597 A1* | 8/2009 | Messinger | F16M 11/14 396/427 |
| 2012/0114324 A1* | 5/2012 | Volkert | F16M 11/041 396/428 |
| 2013/0078855 A1* | 3/2013 | Hornick | H01R 13/73 439/571 |

(Continued)

FOREIGN PATENT DOCUMENTS

CN 202979112 U 6/2013
CN 203840440 U 9/2014

*Primary Examiner* — Amy Hsu
(74) *Attorney, Agent, or Firm* — Boyle Fredrickson, S.C.

(57) ABSTRACT

A camera including at least one camera lens disposed on or in the outer surface of a front wall of housing and an inwardly projecting concave dome recessed within a rear wall of the outer surface of the housing. The housing lacks protrusions extending rearwardly of the rear wall. The dome may be semi-spherical in shape, symmetrically bifurcated by a longitudinal bisector of the housing, and asymmetrically bifurcated by a latitudinal bisector of the housing.

20 Claims, 4 Drawing Sheets

(56) References Cited

U.S. PATENT DOCUMENTS

2015/0351266 A1* 12/2015 Micko .................... F16B 9/026
                                                      361/809
2016/0138754 A1*  5/2016 Li ....................... F16M 13/022
                                                      248/206.5

* cited by examiner

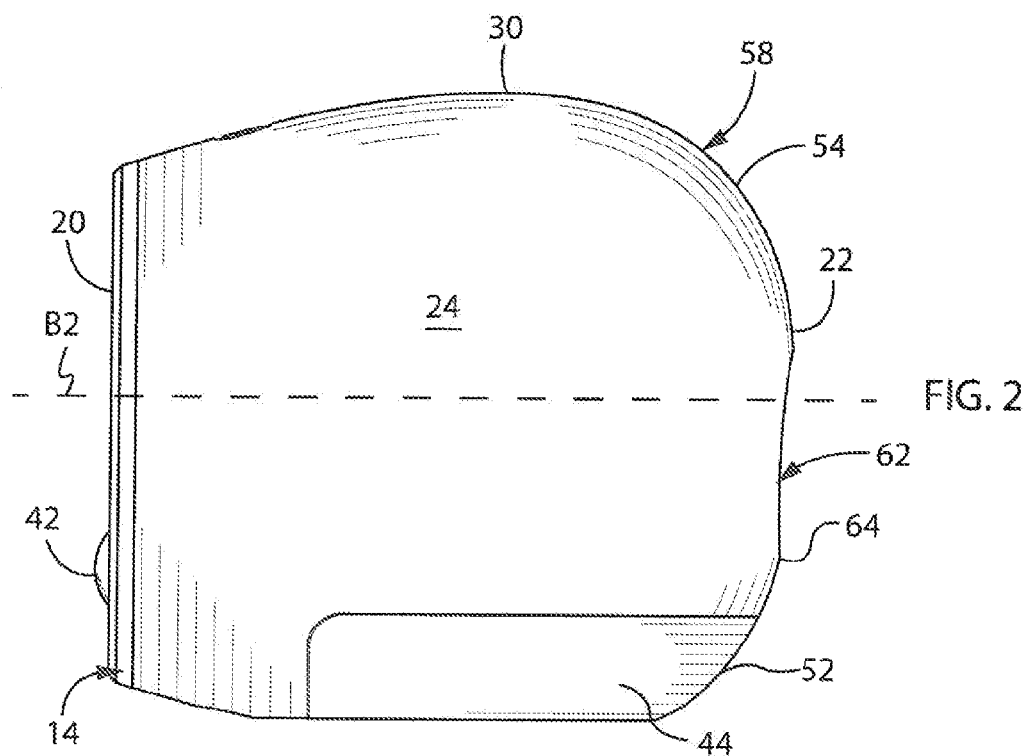
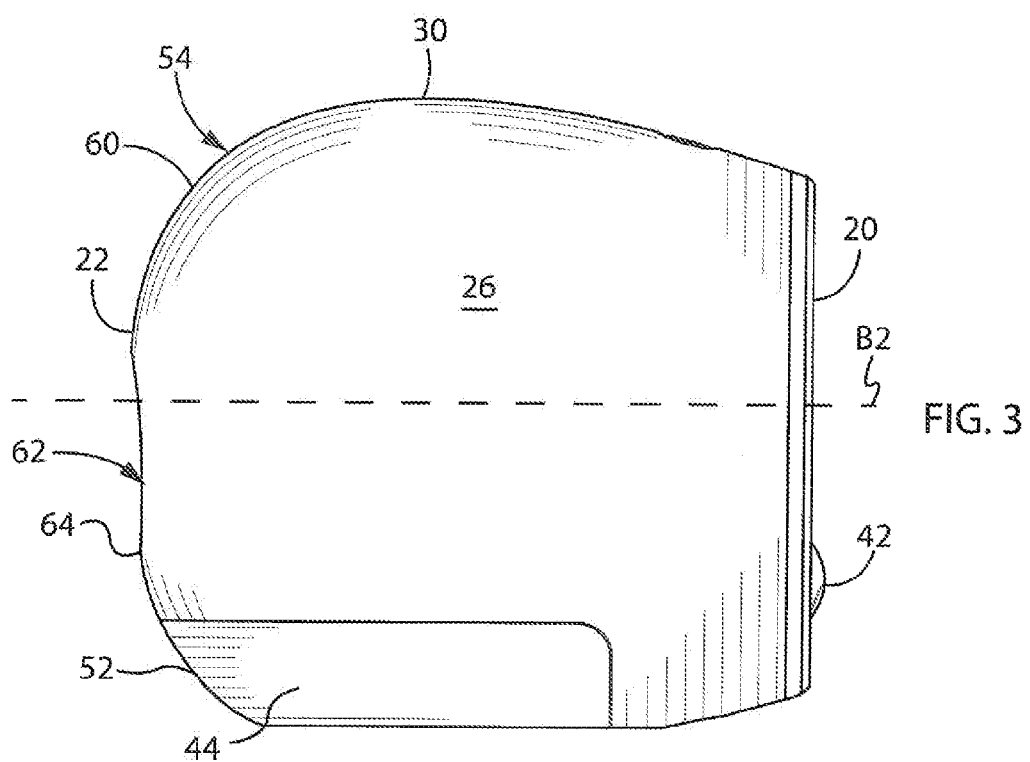

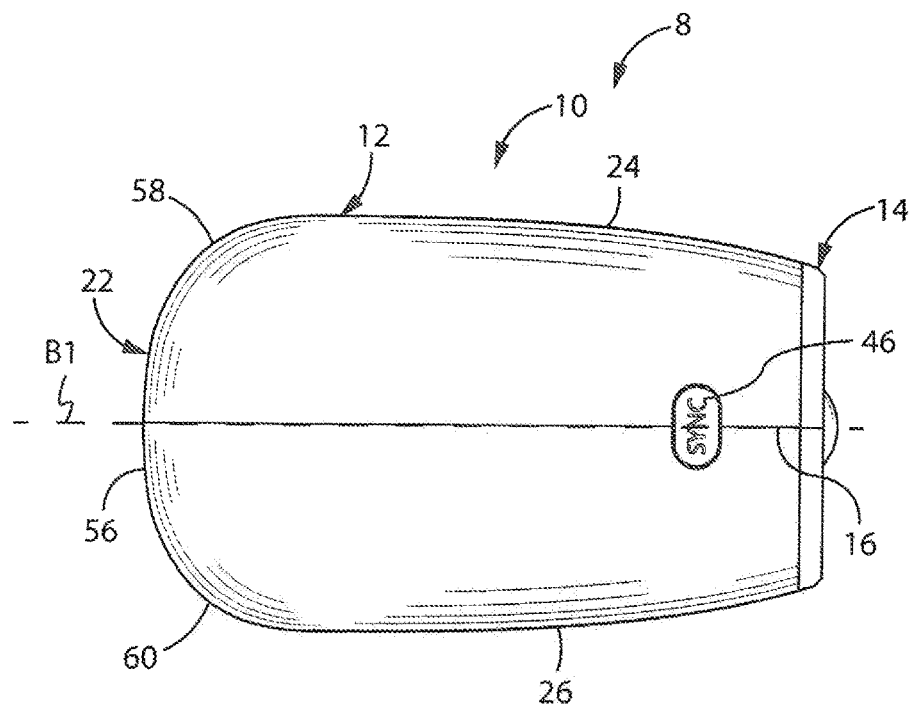
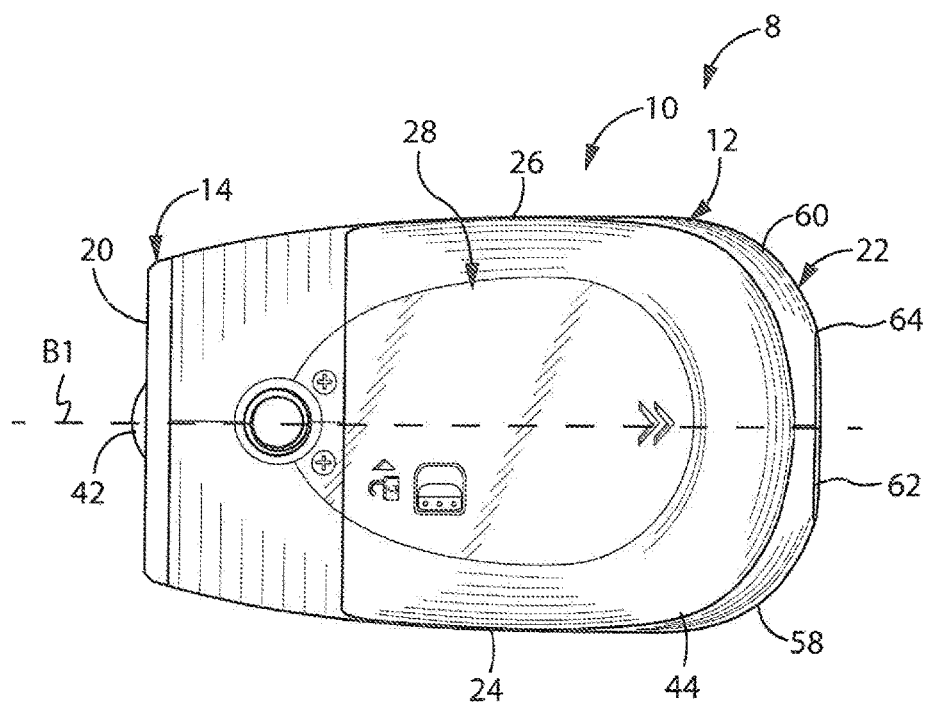

CAMERA WITH HOUSING CONFIGURED TO RECEIVE MOUNTING STRUCTURE

CROSS-REFERENCE TO RELATED APPLICATIONS

This application is a continuation-in-part of and claims the benefit of the filing date of co-pending U.S. Design patent application Ser. No. 29/539,891, filed on Sep. 18, 2015 and entitled "Camera," the entire contents of which are hereby expressly incorporated by reference into the present application.

BACKGROUND OF THE INVENTION

1. Field of the Invention

The invention relates generally to a camera, and more particularly to a camera with an inwardly projecting concave dome recessed into the camera housing and configured to receive a convex mounting structure therein.

2. Discussion of the Related Art

As wireless network capabilities have continued to expand, the availability of network connected peripheral devices has similarly experienced growth. Amongst these peripheral devices, the general remote sensor industry has experienced significant expansion as a result of improved wireless networking capabilities and expanding consumer demand. In particular, wireless network compatible cameras have become increasingly commonplace. Largely driven by their flexibility and general ease of use, wireless network compatible cameras are often used for home security, business security, child monitoring, pet monitoring, etc. However, many of these cameras are integrated into or cooperate with a mounting system that significantly limits their range of motion when adjusting the field of view the camera. Alternatively, many of these cameras must be mechanically disengaged from their respective mounting systems, often through the use of hand tools such as a screwdriver, in order to perform maintenance or to replace the camera power supply.

Thus, there is need for a wireless network compatible camera having a greater a range of motion than prior cameras.

There is additionally a need for a wireless camera that is more easily repositionable on its mount than prior cameras.

SUMMARY OF THE INVENTION

One or more of the above-identified needs are met by a camera including a housing having front and rear walls, at least one camera lens disposed on or in the outer surface of the front wall, and a concave dome recessed within an at least generally planer surface portion of the rear wall. The concave dome projects inwardly from the outer surface of the rear wall.

In one embodiment, the dome has an at least generally circular outer peripheral edge, which may be contiguous with the outer surface of the housing.

In one embodiment, the peripheral edge of the outer dome surface has a diameter equal to approximately half of a width of the rear wall of the housing.

In one embodiment, the concave dome is symmetrically bifurcated by a longitudinal bisector of the housing.

In one embodiment, the concave dome is asymmetrically bifurcated by a latitudinal bisector of the housing.

In one embodiment, the concave dome is an at least generally hemi-spherical dome.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings, in which like reference numerals represent like parts throughout, and in which:

FIG. 2 is a right-side elevation view of the camera shown in FIG. 1;

FIG. 3 is a left-side elevation view of the camera shown in FIG. 1;

FIG. 4 is a top plan view of the camera shown in FIG. 1;

FIG. 5 is a bottom plan view of the camera shown in FIG. 1;

DETAILED DESCRIPTION OF THE PREFERRED EMBODIMENTS

A wide variety of cameras could be constructed in accordance with the invention as defined by the claims. Hence, while exemplary embodiments of the invention will now he described with reference to a camera for use with a wireless network, it should be understood that the invention is in no way so limited.

Figure 1:
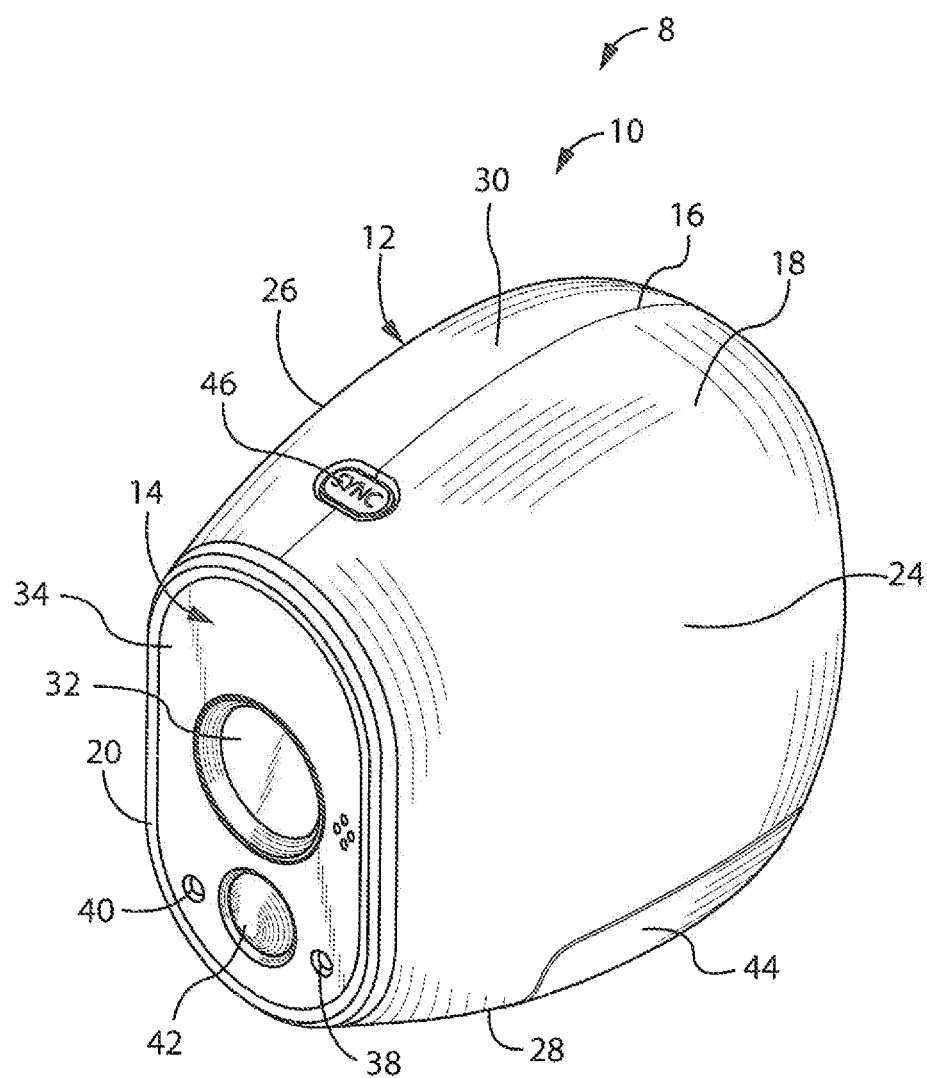
FIG. 1 is a perspective view of a camera according to one embodiment of the present invention, viewed from above, in front of, and the right side of the camera.
Figure 6:
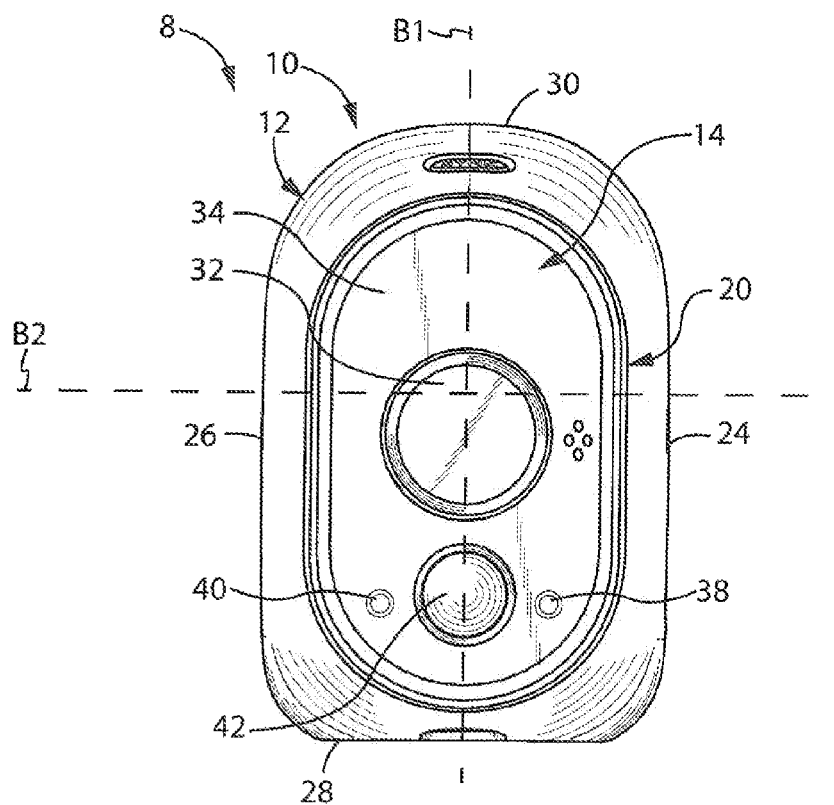
FIG. 6 is a front elevation view of the camera shown in FIG. 1.

FIG. 1 is an isometric view of a camera 8 in accordance with one embodiment of the present invention. The camera 8 includes a housing 10 including a housing body 12 and having a front cover 14. The camera body 12 and cover 14 may be made from a plastic material such as an injection-molded plastic. The body 12 is in two parts that are joined at a seam 16 extending along a longitudinal bisector B1 of the body 12 (FIGS. 4-7). The body 12 and cover 14 of housing 10 collectively have an outer surface 18.

Referring collectively to FIGS. 1-6, the housing 10 includes a front wall 20, a rear wall 22 opposite the front wall 20, a pair of side walls 24, 26, a bottom surface 28, and a top surface 30. A camera lens 32 is disposed on or in a recessed planar portion 34 of the outer surface 18 of the front wall 20. Indicators 38 and 40 and a LED lens 42 are located on the planar portion 34 of front wall 20 beneath the lens 32. A battery compartment is formed in the bottom of the housing body 12 and is accessible via a cover 44 accessible from the bottom surface 28. A SYNC button 46 is provided on the top surface 30 near the front of the housing body 12.

The housing 10 is symmetrical about the longitudinal bisector B1 (FIGS. 4-7). Hence, the side walls 24, 26 of the housing body 12 are minor images of each other. Each is generally planar over most of the surface area thereof, but curves inwardly at its upper edge where it merges into the associated outer edge of the top surface 30. The top surface 30 is curvilinear except at the transverse center thereof, curving downwardly and outwardly along most of its width to the side walls 24 and 26

Figure 7:
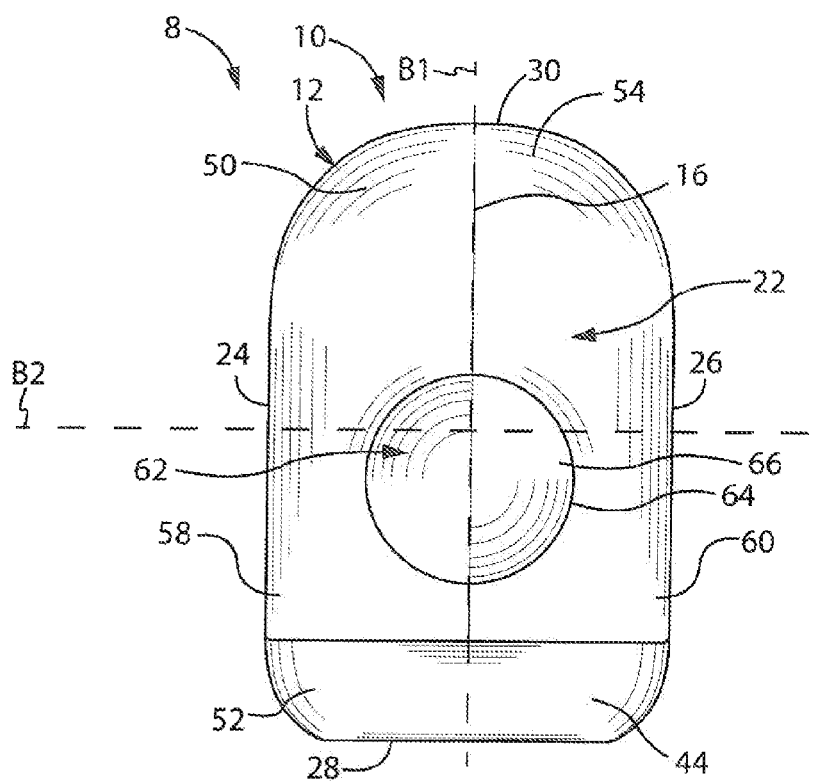
FIG. 7 is a rear elevation view of the camera shown in FIG. 1.

Referring now to FIGS. 2-7, and particularly FIG. 7, the housing body 12 is devoid of protrusions extending outwardly from rear wall 22. Rear wall 22 comprises an upper portion 50 and a lower portion 52. The lower portion 52 is formed by the rear of the battery compartment cover 44 and is curvilinear, sloping downwardly and forwardly from its upper edge. The upper portion 50 presents an upper curvilinear surface 54 and a central generally planar surface portion 56. Planar surface portion 56 is flanked on both sides by first and second curved portions 58, 60 that merge into the respective side walls 24 and 26. A concave dome 62 is recessed within the planar surface portion 56 of the rear wall 22 so as to project inwardly or forwardly of the camera 8 from the generally planar surface portion 56.

The concave dome 62 may be configured to receive and releasably engage a convex mounting structure therein (not shown). The mounting structure and/or an interior element of the camera 8 may be magnetic to form a magnetic mount. The absence of protrusions extending outwardly from the rear wall 22 facilitates increased range of motion of the camera 8 about the mounting structure.

Turning now to FIG. 7, the concave dome 62 may be positioned within the rear wall 22 such that the concave dome 62 is symmetrically bifurcated by the longitudinal bisector B1 of the housing 10. Additionally, the concave dome 62 may be positioned within the rear wall 22 such that it is asymmetrically bifurcated by a latitudinal bisector B2 of the housing 10. The concave dome 62 is bordered by a generally circular outer peripheral edge 64 that is contiguous with the outer surface of the rear wall 22. An outer dome surface 66 is defined within the outer peripheral edge 64 of the concave dome 62. As shown in FIG. 7, the outer peripheral edge 64 may have a diameter equal to approximately half of a width of the rear wall 22 of the housing 10. The concave dome 62 is at least a generally hemi-spherical dome.

It is contemplated that an alternative embodiment may incorporate any of the features of the previous embodiment described above.

Many other changes and modifications could be made to the invention without departing from the spirit thereof.

We claim:

1. A camera, comprising:
   a housing having an outer surface;
   at least one camera lens disposed on or in a front portion of the outer surface of the housing; and
   a concave recess having a generally circular cross section asymmetrically disposed within the outer surface of the housing relative to a latitudinal bisector of the housing, at least substantially of an entirety of the concave recess projecting inwardly from the outer surface of the housing.

2. The camera of claim 1, wherein the concave recess has an at least generally curvilinear outer peripheral edge.

3. The camera of claim 2, wherein the outer peripheral edge of the concave recess is contiguous with the outer surface of the housing.

4. The camera of claim 2, where the outer peripheral edge of the concave recess is generally circular.

5. The camera of claim 1, wherein the concave recess is symmetrically bifurcated by a longitudinal bisector of the housing.

6. The camera of claim 1, wherein the concave recess is a dome.

7. The camera of claim 6, wherein the dome is an at least generally hemi-spherical dome.

8. The camera as claim 1, wherein the concave recess is recessed into an at least generally planar surface portion of the outer surface of the housing.

9. The camera of claim 8, wherein the concave recess of the housing comprises a curvilinear surface surrounding the at least generally planar surface portion.

10. The camera of claim 1, wherein the front portion of the outer surface of the housing has a generally planer surface, and wherein the at least one camera lens is disposed within the generally planar surface.

11. A wireless camera, comprising:
    a housing having an outer surface;
    at least one camera lens disposed within a front portion of the outer surface of the housing; and
    a generally radially symmetrical recess having a circular cross section disposed within the outer surface of the housing, the recess projecting inwardly from the outer surface of the housing, the recess including an outer surface defined within a curvilinear peripheral edge of the recess, wherein the curvilinear peripheral edge of the recess is contiguous with the outer surface of the housing that is generally devoid of protrusions that extend outwardly from the outer surface adjacent the curvilinear peripheral edge.

12. The wireless camera of claim 11, wherein the concave recess projects inwardly from an inner periphery of the generally planar surface portion of the rear wall of the housing.

13. The wireless camera of claim 11, wherein at least substantially an entirety of the concave recess projects inwardly from the outer surface of the housing.

14. The wireless camera of claim 11, wherein the front wall of the housing includes a generally planer surface portion, and wherein the at least one camera lens is disposed within the generally planar surface portion of the front wall of the housing.

15. The wireless camera of claim 11, wherein the curvilinear peripheral edge of the recess is coplanar with a portion of the outer surface of the housing.

16. A wireless camera, comprising:
    a housing having an outer surface in which is formed a concave recess, the concave recess having a generally circular cross section asymmetrically disposed within the outer surface of the housing relative to a latitudinal bisector of the housing, at least substantially of an entirety of the concave recess projecting inwardly from the outer surface of the housing; and
    at least one camera lens disposed within a front portion of the outer surface of the housing.

17. The wireless camera of claim 16, wherein an outer end of the concave recess is contiguous with the outer surface of the housing.

18. The wireless camera of claim 16, wherein the concave recess is generally radially symmetrical.

19. The wireless camera of claim 16, wherein an outer end of the concave recess is essentially coplanar with a portion of the outer surface of the housing.

20. The wireless camera of claim 16, wherein an outer end of the concave recess is generally circular.

* * * * *